Feb. 19, 1935.  C. E. JOHANSSON  1,991,854
APPARATUS FOR DEMONSTRATING THE ADHESION OF FLAT SURFACES
Filed April 13, 1933
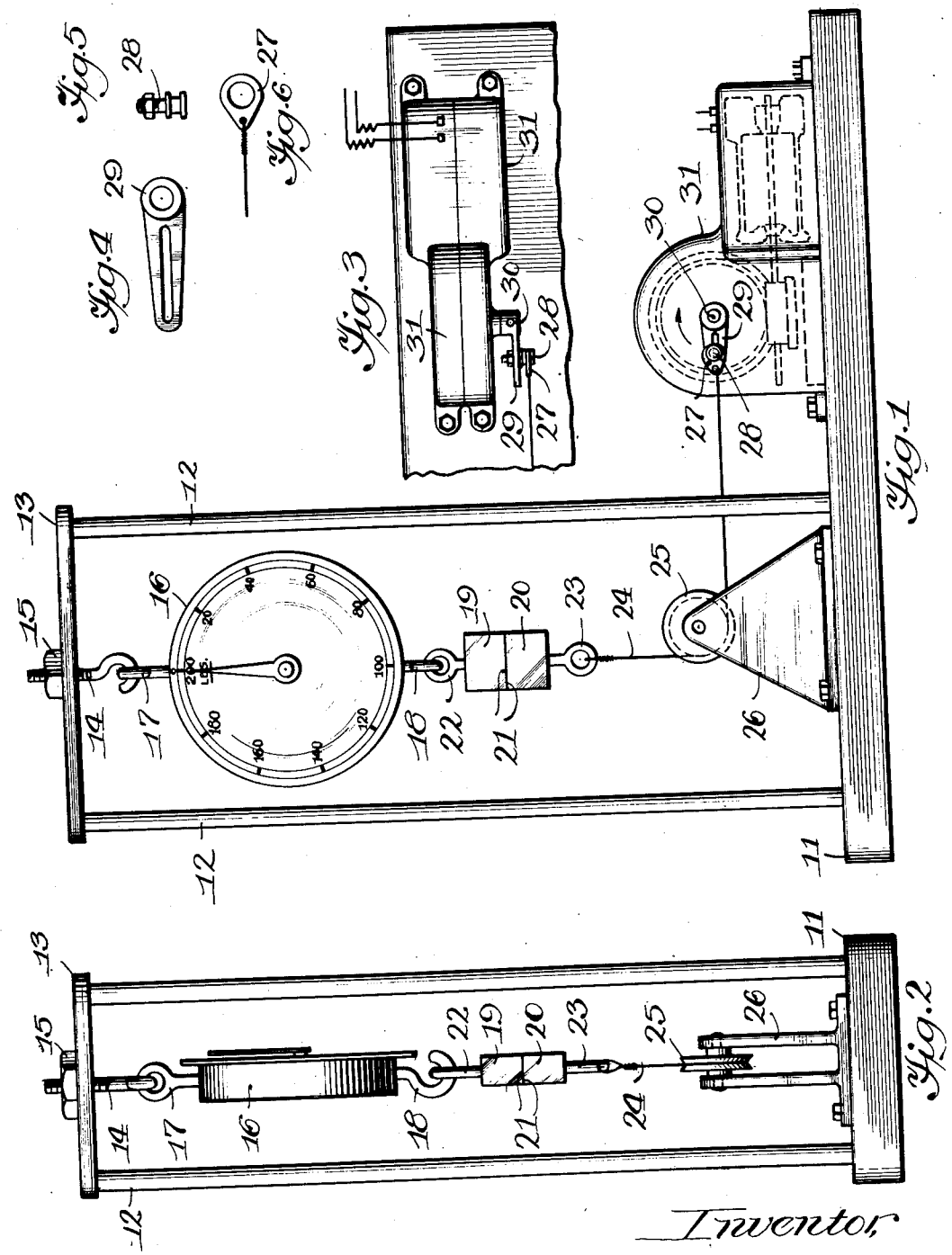

Patented Feb. 19, 1935

1,991,854

UNITED STATES PATENT OFFICE 1,991,854

APPARATUS FOR DEMONSTRATING THE ADHESION OF FLAT SURFACES

Carl Edvard Johansson, Detroit, Mich.

Application April 13, 1933, Serial No. 665,901

4 Claims. (Cl. 35—12)

This invention relates to improvements in apparatus for demonstrating the adhesion of flat surfaces, such as the accurately finished surfaces of "Johansson gauges."

Such gauges, in the form of flat plates, are made in various thicknesses, the dimensions being accurate to a very small fraction of a thousandth of an inch, and in some cases to within a millionth of an inch. The surfaces of such plates approach so closely to true plane surfaces that when two of said plates, having for example an area of one half of one square inch each, are "wrung" together by sliding one over the other with a turning motion and pressing them together at the same time, said plates cannot be pulled apart by hand, so firmly do they adhere. If the air between the two plates were entirely squeezed out, the force necessary to pull them apart, assuming they were held together by air pressure only, would be about seven pounds, whereas in practice, the force required is several times this amount and may exceed one hundred pounds per half square inch. This phenomenon is so difficult of explanation that it has been the subject of considerable speculation and it requires demonstration to overcome the incredulity of the layman.

The apparatus selected as the preferred embodiment of the present invention is designed to demonstrate, in striking fashion, the adhesion of such plates, or of blocks of metal having engaging surfaces of comparable accuracy. Such demonstration apparatus may be used as an advertising display in windows, or at expositions, for example, or for educational or other purposes.

The objection of the invention is to provide apparatus for indicating plainly, by a scale or the like, the pull which such blocks may withstand.

Contributory objects are to provide apparatus by which the force tending to separate the blocks may be applied intermittently and automatically by a motor driven device whereby the demonstration may be continued for long periods of time.

Other objects and advantages will be apparent from the following description.

Fig. 1 of the drawing is a front elevation of the apparatus;

Fig. 2 is a side elevation thereof;

Fig. 3 is a partial plan view;

Fig. 4 is an enlarged elevation of the slotted crank lever;

Fig. 5 is an enlarged plan view of the crank lever bolt; and

Fig. 6 is an enlarged view of a wire attaching ring.

The apparatus may be mounted on a suitable base plate 11, having upright standards or posts 12 thereon, carrying a horizontal plate 13 through which is inserted a hook 14, said hook being adjusted vertically by a nut 15. From said hook is suspended a scale 16 by means of an eye bolt 17. Said scale may be of any suitable standard manufacture, having the usual hand which indicates the pull applied in pounds or other standards of weight. The pull is applied by means of a hook 18 at the bottom.

The blocks 19 and 20, the adhesion of which it is desired to demonstrate, are made preferably of steel, with adjoining faces 21 smooth and plane, i. e. finished similarly to the Johansson gauge blocks above referred to. These pieces of steel, as shown, are in the form of comparatively thick blocks so that they may be drilled and tapped for hooks or eye bolts through which the force is applied tending to pull them apart. It will be understood, however, that they may be made in the form of plates, and attached to the associated parts in various different ways.

Furthermore, more than two blocks or plates may be wrung together to form of series of such plates or gauges, the pull being applied to the top and bottom plate of the series.

The upper plate or block may be suspended by means of an eyelet or eye bolt 22 screwed therein, and the lower plate or block may have a similar eyelet or eye bolt 23 screwed therein, from which a flexible tension member such as a wire 24 may be attached. Said wire runs over a pulley 25 mounted in a frame 26 on the base. The other end of said wire is fastened to a ring 27 which surrounds a pin or bolt 28 adjustably secured to the slotted crank 29. Said crank is mounted on the shaft 30 of a motor driven speed reducing device 31, which may be of any suitable type, to rotate said shaft slowly.

In operation, when the motor is started, the crank rotates in the direction shown by the arrow in Fig. 1 and by means of the wire applies a downward pull through the blocks, on the scale, which pull can be read and may be observed at a distance. As the lever rotates, the hand on the pointer moves from zero position or a point near zero to the point indicating the maximum pull and then gradually returns to initial position. By moving the bolt 28 toward or away from the axis of rotation of the crank, the effective length of said crank becomes longer or shorter and will result in a greater or less maximum pull. By adjusting the nut 15, the wire can always be kept under tension and the various parts in the chain of elements under tension can be given a preloading and thus increase the maximum tension on the same, including the force or pull tending to separate the two or more blocks.

I claim:

1. Demonstration apparatus comprising a support, a plurality of gauge blocks wrung together, a fastening device attached to each of said blocks, means connecting one of said fastening devices to said support, a tension member connected to the other of said fastening devices, a continuously operating mechanical means for intermittently applying a pull to said tension member insufficient to separate said blocks, and an indicating instrument connected between said support and said pull applying means to indicate said pull whereby said apparatus demonstrates that the adhesion of said blocks is in excess of the maximum reading of said instrument.

2. Demonstration apparatus comprising a support, a scale suspended therefrom, a plurality of gauge blocks wrung together, the upper of which blocks is connected to said scale, a tension member connected to the lower of said blocks, a motor driven speed reduction device having a crank thereon and means connecting said tension member to said crank to apply an intermittent force to said blocks insufficient to pull them apart, said scale indicating an adhesion in excess of the maximum force applied, whereby said blocks are alternately pulled downwardly and restored to initial position.

3. Demonstration apparatus comprising a support, a scale suspended therefrom, a plurality of gauge blocks wrung together, the upper of which blocks is connected to said scale, a tension member connected to the lower of said blocks, a motor driven speed reduction device having a slotted crank thereon, a pin adjustably mounted in said slot and a pulley beneath said blocks under which said tension member passes and is connected to said pin whereby said blocks are drawn downwardly at regular intervals, during half rotations of said crank, by a force tending to separate them, and are restored to initial position during the remaining half rotations of said crank.

4. A device of the class described, comprising a base, a pair of upright supports thereon, a transverse member at the top thereof, a supporting device passing through said member and adjustably secured by a nut, a scale suspended from said device, a pair of gauge blocks wrung together the upper of which has an eye bolt connected to said scale and the lower of which has an eye bolt for attachment of a flexible tension member, a pulley mounted on said base beneath said blocks, a motor driven reduction gearing device mounted on said base at one side of said pulley, said tension member passing downwardly and under said pulley to said reduction gearing device, the latter having a rotating shaft, a slotted crank thereon, a pin adjustable in said slot and a ring surrounding said pin to which said tension member is fastened, whereby the rotation of said arm will pull said blocks downwardly, intermittently, and said scale will restore them to normal position, after each downward pull.

CARL EDVARD JOHANSSON.